(12) United States Patent
Shimizu

(10) Patent No.: US 9,241,157 B2
(45) Date of Patent: Jan. 19, 2016

(54) IMAGING APPARATUS

(71) Applicant: DENSO CORPORATION, Kariya, Aichi-pref. (JP)

(72) Inventor: Nobuhisa Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/389,085

(22) PCT Filed: Mar. 26, 2013

(86) PCT No.: PCT/JP2013/058705
§ 371 (c)(1),
(2) Date: Sep. 29, 2014

(87) PCT Pub. No.: WO2013/146744
PCT Pub. Date: Oct. 3, 2013

(65) Prior Publication Data
US 2015/0085140 A1    Mar. 26, 2015

(30) Foreign Application Priority Data

Mar. 30, 2012 (JP) ................................ 2012-081605

(51) Int. Cl.
*H04N 17/00* (2006.01)
*H04N 5/232* (2006.01)

(52) U.S. Cl.
CPC ............. *H04N 17/002* (2013.01); *H04N 5/232* (2013.01)

(58) Field of Classification Search
CPC .............................. H04N 17/002; H04N 5/232
See application file for complete search history.

(56) References Cited

U.S. PATENT DOCUMENTS 5,218,294 A * 6/1993 Soiferman ........... G01R 31/315
                                                     324/763.01
5,414,343 A * 5/1995 Flaherty ............... G01R 31/024
                                                     324/539

(Continued)

FOREIGN PATENT DOCUMENTS

JP        H10108222 A    4/1998
JP       2001204012 A    7/2001

(Continued)

OTHER PUBLICATIONS

International Preliminary Report on Patentability (with English translation) dated Oct. 9, 2014 for PCT/JP2013/058705.

(Continued)

*Primary Examiner* — Michael Lee
(74) *Attorney, Agent, or Firm* — Harness, Dickey & Pierce, P.L.C.

(57) ABSTRACT

An imaging apparatus includes an imaging unit that is provided with an image pickup device and a fixed pattern outputting section that outputs a fixed pattern set in advance and includes a control unit and a path. The control unit is electrically connected to the imaging unit and receives an image acquired by the image pickup device and a fixed pattern outputted from the fixed pattern outputting means. The path electrically connects the imaging unit and the control unit, and electrically transmits an image and a fixed pattern from the imaging unit to the control unit. The control unit controls, depending on the image, an application which requires the image as one of inputs to the application. Further, the control unit compares a specific pattern prepared in advance according to the fixed pattern, with the fixed pattern, to determine the occurrence of an anomaly in the electrical connection of the path.

2 Claims, 5 Drawing Sheets

(56) References Cited

U.S. PATENT DOCUMENTS

| | | | |
|---|---|---|---|
| 2001/0056556 A1* | 12/2001 | Sugino | H04B 14/048 714/703 |
| 2002/0095631 A1* | 7/2002 | Hui | G01R 31/318558 714/724 |
| 2006/0193621 A1 | 8/2006 | Miyake | |
| 2008/0019611 A1 | 1/2008 | Larkin et al. | |
| 2009/0174808 A1 | 7/2009 | Mochida et al. | |

FOREIGN PATENT DOCUMENTS

| | | | |
|---|---|---|---|
| JP | 2005073296 A | 3/2005 |
| JP | 2006211235 A | 8/2006 |
| JP | 2006235285 A | 9/2006 |
| JP | 2007531420 A | 11/2007 |
| JP | 2008283431 A | 11/2008 |
| JP | 2009157087 A | 7/2009 |
| JP | 2009278340 A | 11/2009 |
| JP | 2010136823 A | 6/2010 |

OTHER PUBLICATIONS

International Search Report (in Japanese with English Translation) for PCT/JP2013/0058705, mailed May 7, 2013; ISA/JP.

Written Opinion for PCT/JP2013/0058705, mailed May 7, 2013; ISA/JP.

* cited by examiner

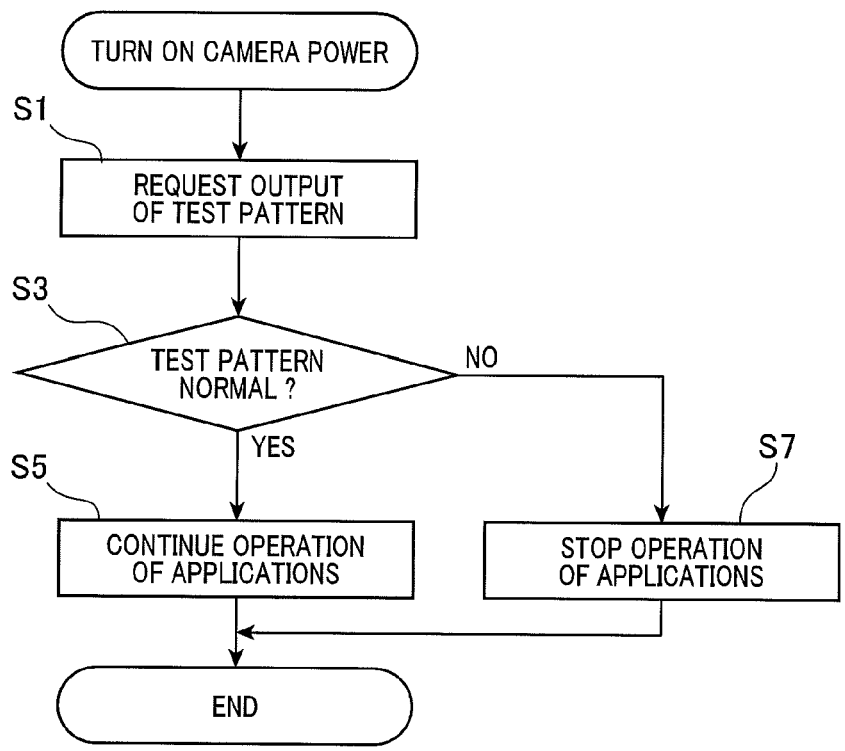
FIG.3
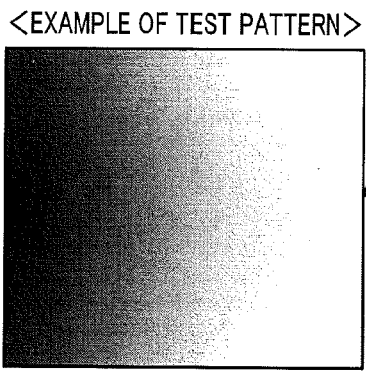
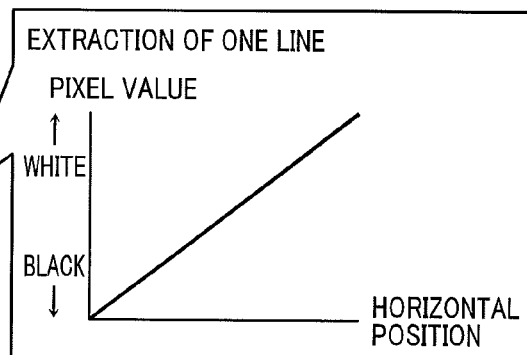
FIG.4

FIG.6
(A)
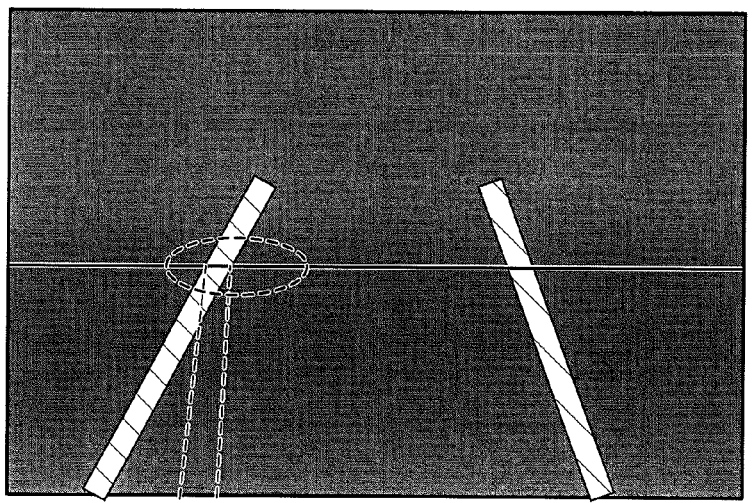
(B)
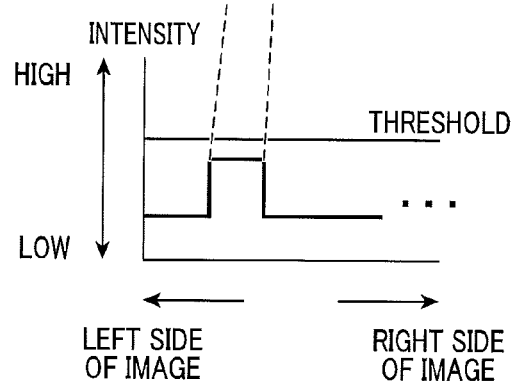

IMAGING APPARATUS

CROSS REFERENCE TO RELATED APPLICATIONS

This application is a U.S. National Phase Application under 35 U.S.C. 371 of International Application No. PCT/JP2013/058705 filed on Mar. 26, 2013 and published in Japanese as WO 2013/146744 A1 on Oct. 3, 2013. This application is based on and claims the benefit of priority from Japanese Patent Application No. 2012-081605 filed on Mar. 30, 2012. The entire disclosures of all of the above applications are incorporated herein by reference.

BACKGROUND

1. Technical Field

The present invention relates to an imaging apparatus which picks up an image of a field of view and in particular to an imaging apparatus which includes an imaging unit that picks up an image of a field of view and a control unit that is electrically connected to the imaging unit to perform control according to the picked up image, the apparatus having a function of determining or detecting an anomaly in the electrical connection.

2. Related Art

Various fields of art make use of an imaging apparatus for picking up an image in accord with light that is incident from a field of view. A well-known imaging apparatus as one type of such an imaging apparatus includes an imaging unit and a control unit electrically connected to the imaging unit to perform control according to the picked up image. Recently, this type of imaging apparatus is increasingly installed in vehicles. For example, some techniques offer to pick up an image around a vehicle and process the picked up image to reflect the results of the processing to the traveling of the vehicle.

However, if any anomaly, such as disconnection, occurs in the electrical connection between the imaging unit and the control unit, the control unit cannot very often perform control according to the image picked up by the imaging unit. A measure against this problem is disclosed in Patent Document 1. Patent Document 1 discloses an imaging apparatus that picks up an image of the surroundings of a vehicle. The imaging apparatus is configured to determine the occurrence of an anomaly in signals outputted from the imaging unit when the vehicle travels during time that is estimated not to be nighttime, such as when the head lamps are turned off, but when the levels of the electric signals (intensities of a picked-up image) are not more than a predetermined value.

Patent Document 1 JP-A-2001-204012

However, there is a problem in determining the occurrence of an anomaly by comparing, as in Patent Document 1, the level of a signal corresponding to an image picked up by the imaging unit with a predetermined value. Specifically, the predetermined value has to be set to a significantly low value taking account of variations in the characteristics of imaging units or variations among individual drivers as to whether to turn on the head lamps. Therefore, the technique of Patent Document 1 does not necessarily enable, for example, determination on the occurrence of a minor anomaly, such as disconnection in a part of a parallel cable that transmits an image picked up by the imaging unit in the form of a digital signal to a control unit.

SUMMARY

It is thus desired to enable determination on or detection of the occurrence of a minor anomaly in the electrical connection in an imaging apparatus which includes an imaging unit that picks up an image of a field of view and a control unit that is electrically connected to the imaging unit to perform control according to the picked up image.

An imaging apparatus related to a preferred embodiment includes: an imaging unit that is provided with an imaging means for acquiring an image and a fixed pattern outputting means for outputting a fixed pattern set in advance; a control unit that receives input of an image acquired by the imaging means and a fixed pattern outputted by the fixed pattern outputting means; and a path that electrically connects between the imaging unit and the control unit to electrically transmit the image and the fixed pattern from the imaging unit to the control unit. The control unit includes: a control means for exerting control over applications according to the image; and an anomaly determining means for comparing a specific pattern with the fixed pattern outputted from the fixed pattern outputting means, the specific pattern being prepared in advance for the fixed pattern, to determine the occurrence of an anomaly in the electrical connection of the path.

Thus, the control means is able to perform control according to an image picked up by the imaging means. Further, the anomaly determining means is able to determine the occurrence of an anomaly in the electrical connection as follows.

Specifically, the fixed pattern outputted from the fixed pattern outputting means is a fixed pattern set in advance. Therefore, if no anomaly occurs in the path electrically connecting between the imaging unit and the control unit, the same fixed pattern should always be outputted to the control unit as an electric signal. Accordingly, by comparing the specific pattern prepared in advance for the fixed pattern outputted from the fixed pattern outputting means, with the fixed pattern inputted as an electric signal, the anomaly determining means is able to determine the occurrence of an anomaly, covering the occurrence of even a minor anomaly in the electrical connection mentioned above.

BRIEF DESCRIPTION OF THE DRAWINGS

In the drawings:

FIG. 3 is a flow diagram illustrating a process performed by a microcomputer in the camera system;

FIG. 4 shows diagrams illustrating a principle of the process;

FIG. 6 shows diagrams illustrating a state in the occurrence of an anomaly in the camera system, related to the application example.

DETAILED DESCRIPTION OF EMBODIMENTS

With reference to FIGS. 1 to 6, hereinafter is described an embodiment of an imaging apparatus of the present invention.

Figure 1:
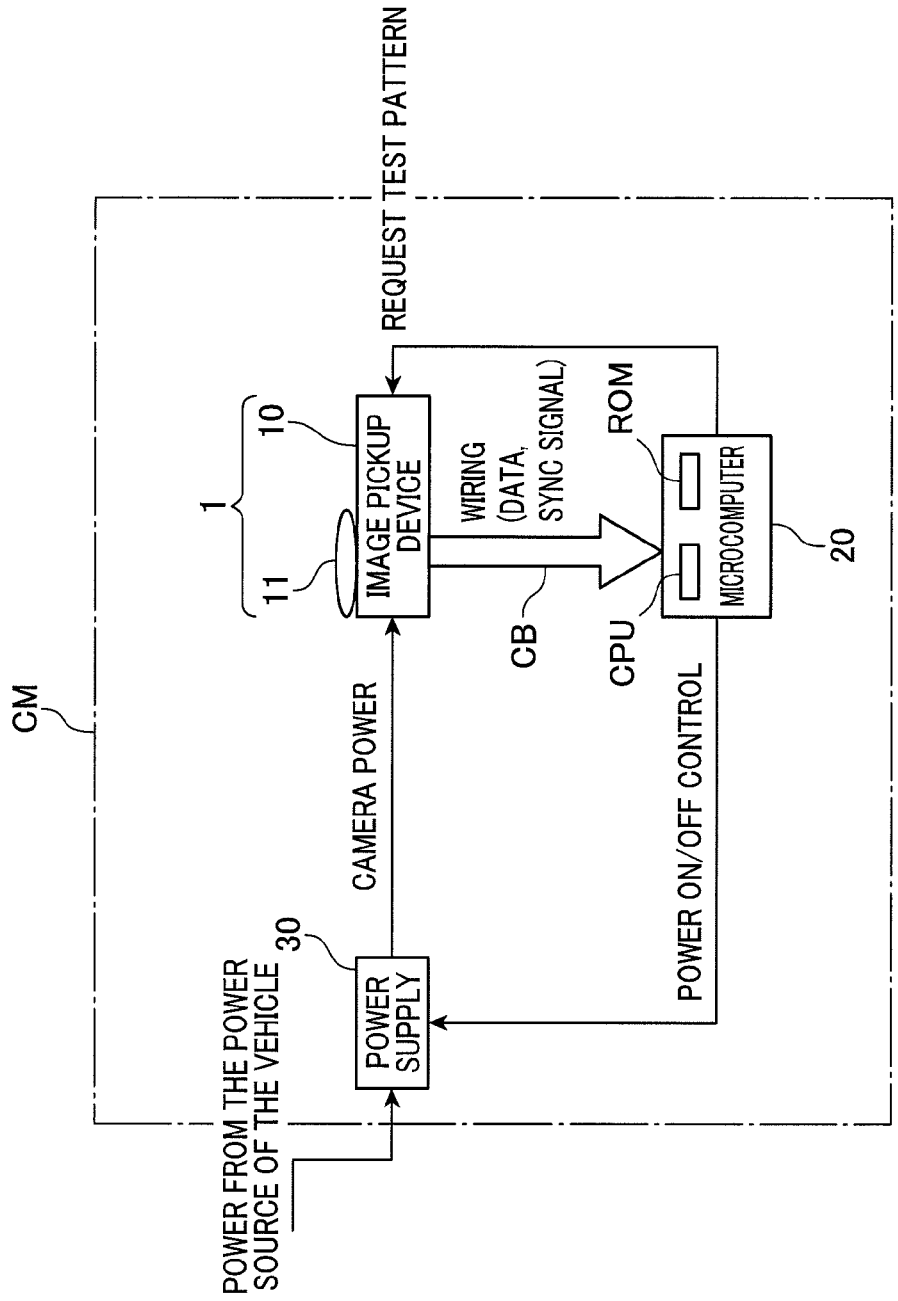
FIG. 1 is a block diagram illustrating a configuration of a camera system to which the present invention is applied.
Figure 2:
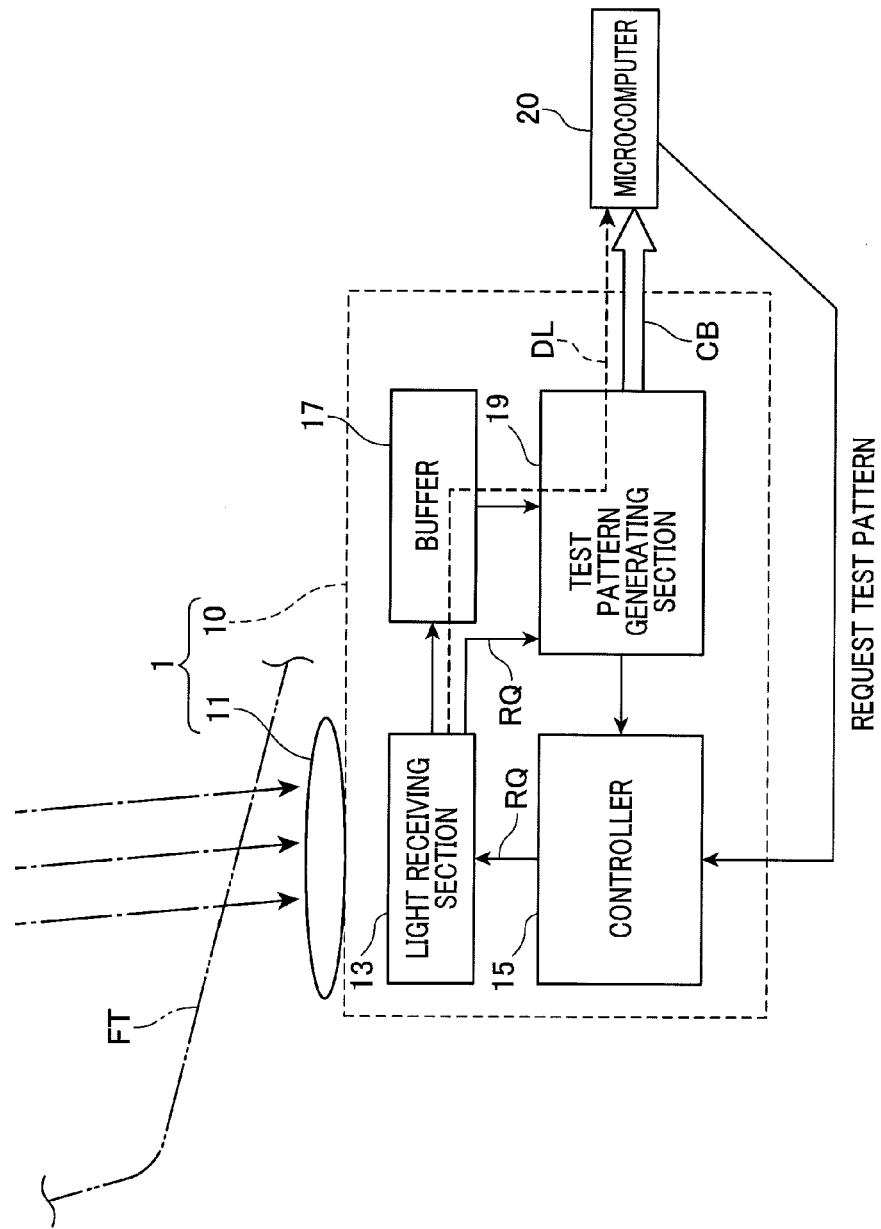
FIG. 2 is a block diagram illustrating a configuration of a camera of the camera system.

FIG. 1 shows a schematic configuration of an in-vehicle camera system CM as an imaging apparatus. The camera system CM of the present embodiment includes an in-vehicle camera 1, as shown in FIG. 2, which is oriented to the outside of a vehicle to acquire an image of a field of view. As shown in FIG. 2, the camera 1 includes an image pickup device 10 formed of a one-chip IC, as well as a lens 11. For example, the camera 1 is provided in the vicinity of the base of a rearview mirror which is located at an upper-center portion of a front windshield of the vehicle. The camera 1 is arranged with the lens 11, or the field of view, being oriented obliquely downward in a forward direction.

As shown in FIG. 2, the image pickup device 10 includes a light receiving section 13, a controller 15, a buffer 17 and a test pattern generating section 19.

Light that is incident via the lens 11 from the camera's field of view, which is oriented to the outside of the vehicle, falls on the light receiving section 13 of the image pickup device 10. The light receiving section 13 includes phototransistors arranged in an array and an AD converter. In response to an instruction from the controller 15, the light receiving section 13 transmits data (electrical signal) corresponding to an image outside the vehicle, which has been picked up via the lens 11, to the test pattern generating section 19 via the buffer 17.

The test pattern generating section 19 applies various processings, such as gamma correction, to the transmitted data and transmits the resultant data to the microcomputer 20 which is externally provided to the camera 1. The transmission is performed via an 8- or 16-bit parallel cable CB. The thick dash line DL in FIG. 2 indicates a flow of the data.

The test pattern generation section 19 also has a function of outputting data that correspond to a test pattern for various adjustments (an example of a fixed pattern). Accordingly, the test pattern is also transmitted to the microcomputer 20 via the parallel cable CB. The microcomputer 20, when requesting transmission of the test pattern, transmits a test pattern request to the controller 15. In response, the request RQ is transmitted to the test pattern generating section 19 via the light receiving section 13. Thus, in response to the request, the test pattern generating section 19 transmits a test pattern to the microcomputer 20.

The test pattern generating section 19 is configured to interrupt image data processing/transmission when transmitting the test pattern. In other words, the test pattern generating section 19 is configured to selectively perform test pattern transmission and image data processing/transmission.

Alternative to the selective transmission of a test pattern, the test pattern generating section 19 may be ensured to parallelly perform the image data processing/transmission as behind-the-scenes processing while the test pattern is outputted. Alternatively, the test pattern generating section 19 may be ensured to parallelly transmit both of the data by performing parallel processing based such as on time sharing.

Further, as shown in FIG. 1, the camera system CM includes a power supply 30 that supplies electric power (camera power) to the image pickup device 10 to allow the image pickup device 10 to perform the imaging operation as mentioned above. The power supply 30 is supplied with electric power from a power source, such as a battery, of the vehicle. The microcomputer 20 is configured so as to be able to output a control signal to the power supply 30 as well to turn on/off the camera power.

FIG. 3 is a flow diagram illustrating a process performed by the microcomputer 20 when an ignition switch of the vehicle is turned on to also turn on the power supply 30. The process is performed by allowing a CPU that is incorporated in the microcomputer 20 to execute a program stored in a ROM that is also incorporated in the microcomputer 20.

As shown in FIG. 3, upon start of the process, the microcomputer firstly requests, at step S1, output of a test pattern to the image pickup device 10. At the subsequent step S3, the microcomputer determines, as follows, whether or not the test pattern is normal, which has been transmitted from the test pattern generating section 19 of the image pickup device 10 in response to the request.

FIG. 4 shows by (A) an example of a two-dimensional test pattern (i.e., the fixed pattern). As shown in FIG. 4 by (A), this test pattern indicates gradual turn of a color into higher tone from the left to the right of the image. When data composing this test pattern is laterally extracted in one line, the line shows changes, as shown in FIG. 4 by (B), in which the pixel value (intensity of each pixel) increases at a constant rate from the left to the right. Specifically, when the data are expressed in terms of 8-bit binary numbers, for example, the pixel value increases, ranging from "00000000" to "11111111", at a constant rate from the left end to the right end.

Then, at step S3, it is determined whether or not the data corresponding to the received test pattern have normal values in accord with such a rule as registered in advance in the microcomputer 20 (an example of a specific pattern). At step S3, the pixel values of the pixels in the horizontally extracted one line do not necessarily have to be individually compared with the rule but may, for example, be compared using a method, such as CRC (cyclic redundancy checksum).

Referring to FIG. 3 again, when the test pattern is normal (YES at step S3), the process proceeds to step S5. At this step, the microcomputer issues an instruction for continuing the operations of various applications using the camera 1, which have been started simultaneously with the turn-on operation of the ignition switch. Then, the process is halted until the next iteration. On the other hand, if the test pattern is anomalous (NO at step S3), the process proceeds to step S7 where the microcomputer issues an instruction for stopping the operations of the applications. At the same time, the microcomputer issues an instruction for turning off the camera power to the power supply 30 to halt the process until the next reiteration.

Accordingly, in the present embodiment, the correctness/incorrectness of each pixel value can be examined on the basis of the information on each bit. In particular, the correctness/incorrectness of each pixel value can also be detected from the information on the last one bit which is normally difficult to be detected. Thus, a minor anomaly, such as disconnection of merely one line in the parallel cable CB or short-circuiting between data lines, can also be well detected. In this way, the correctness/incorrectness can be determined as to not only all the pixel values in one line but also the image data as a whole. This is only because the test pattern is transmitted through the parallel cable CB through which the image data are also transmitted.

In addition, in the occurrence of an anomaly, the operation of the applications can be stopped to also turn off the camera's power supply. Thus, the operations of the applications are prevented from being performed or continued on the basis of the data that do not correctly reflect the image picked up via the camera 1.

Figure 5:
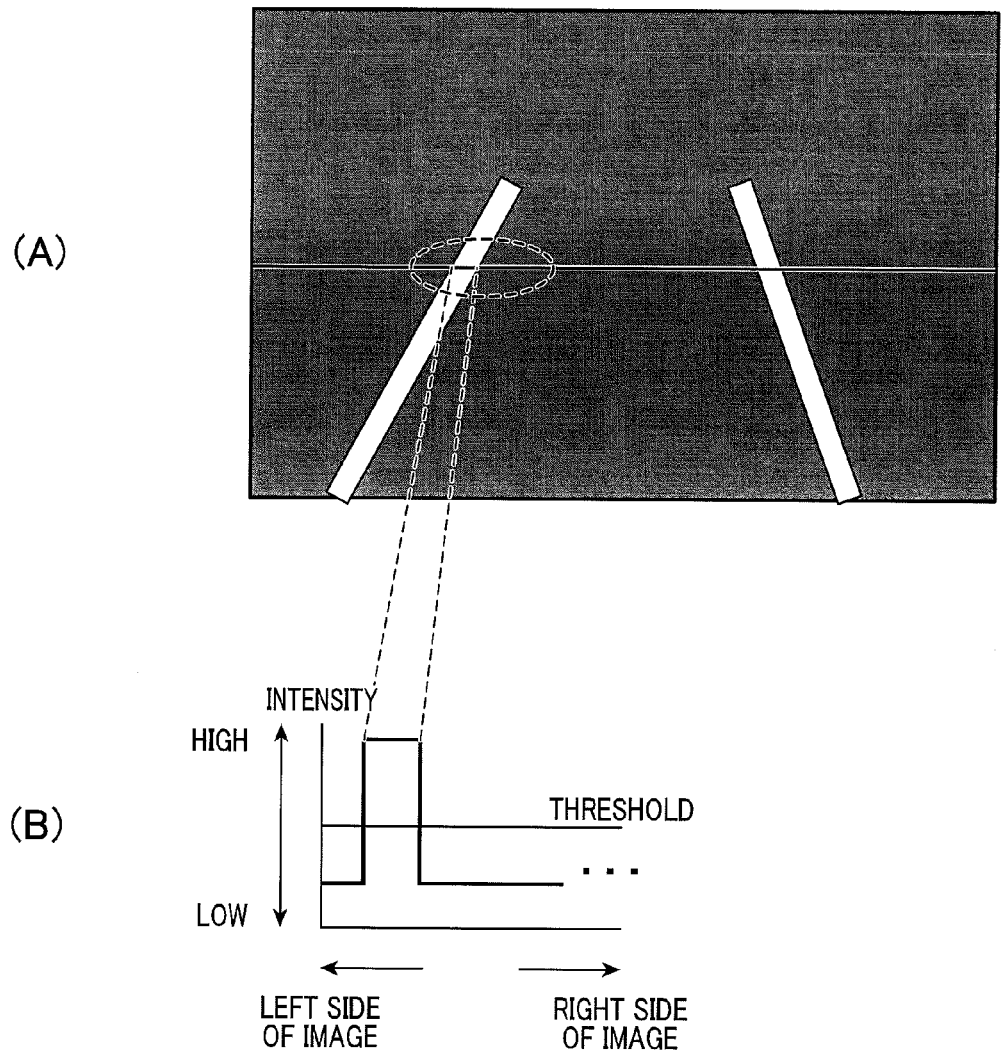
FIG. 5 shows diagrams illustrating an application example of the process.

As an example of the applications, the following description explains a white line departure warning that is given when the vehicle has departed from white lines on a road, as a result of making a determination on the occurrence of departure. The camera 1 arranged at the position of the vehicle as mentioned above picks up an image, as shown in FIG. 5 by (A), of the road surface having white lines. As indicated by the solid line in FIG. 5 by (A), one line is horizontally extracted at the center of the image with respect to the vertical direction, for the observation of the pixel values in the extracted line. The pixel values enclosed by the dash line in (A) of FIG. 5 exhibit a change as shown in FIG. 5 by (B). Specifically, in a portion corresponding to the white line, the pixel value drastically increases and exceeds a threshold. In the control over white line departure warning, the microcomputer 20 recognizes the white lines on the road in this way and gives a warning when the vehicle has departed from the white lines.

Let us suppose that an anomaly, such as disconnection in the cable CB, has occurred and accordingly data that do not correctly reflect an image picked up via the camera 1 have been transmitted to the microcomputer 20. In this case, the image corresponding to the data will, for example, be as shown in FIG. 6. Specifically, in the portion corresponding to a white line, the pixel values do not necessarily well increase and exceed the threshold even in the portion corresponding to the white line. In FIG. 6, the white lines are indicated by diagonal lines to show that the pixel values are lower than those shown in FIG. 5 by (A).

In such a case (i.e. NO at step S3), the control over the white line departure warning is stopped (step S7).

When the operation of an application is interrupted as described above, the driver may be informed accordingly via a display at the driver's seat and further the driver may be informed that the camera 1 has an anomaly. Under such control, the driver cannot find the anomaly of the data transmitted to the microcomputer 20, unlike the case where an image corresponding to the data transmitted to the microcomputer 20 is shown on a display or the like. Accordingly, applying the present embodiment to the control that does not involve such displaying processing, the effect of the embodiment becomes more useful, the effect being that the occurrence of an anomaly, such as disconnection as described above can be detected.

In the foregoing embodiment, the light receiving section 13 corresponds to the imaging means, the test pattern generating section corresponds to the test pattern outputting means, the image pickup device 10 corresponds to the imaging unit, the microcomputer 20 corresponds to the control unit, the processing at step S5 performed by the microcomputer 20 corresponds to the control means, and the processing at step S3 performed by the microcomputer 20 corresponds to the anomaly determining means.

Other Embodiments of the Present Invention

The present invention shall not be limited at all to the configuration of the foregoing embodiment but may be implemented in various modes within a scope not departing from the spirit of the present invention.

For example, the process of FIG. 3 does not have to be necessarily performed when the power is on but may be periodically performed once in several seconds. Further, the fixed pattern shall not be limited to the gradation pattern as shown in FIG. 4 by (A) but may be a different fixed pattern. Further, other than the white line departure warning mentioned above, the present invention may be applied to an automatic high-beam control under which a high beam is emitted in the absence of a preceding vehicle, or a collision avoidance control under which braking is automatically applied when the vehicle has come close to a preceding vehicle, or the like. Further, other than vehicles, the present invention may be applied to machines for consumers.

In the foregoing embodiment, a fixed pattern is compared with a specific pattern using CRC but other checksum techniques may be used. However, the CRC imposes only a small load on the microcomputer 20 compared to the case where individual pixel values are subject to comparison, and thus can enhance the accuracy more than the case of using the other checksum techniques. The specific pattern with which a comparison is made does not have to be necessarily the same as the fixed pattern but may, for example, be the complement or the like of the pixel values of the fixed pattern.

Further, the request for outputting a test pattern at step S1 of FIG. 3 may be omitted in the case where a test pattern is periodically outputted, or automatically outputted when the power supply is turned on. The expression "electrical connection" or "electrically connected" in the present embodiment shall not be limited to a connection via a parallel cable but may be a connection via a conductor on a printed circuit board or a conductive portion in an IC.

BRIEF DESCRIPTION OF SYMBOLS

1 . . . Camera
10 . . . Image pickup device
11 . . . Lens
13 . . . Light receiving section
19 . . . Test pattern generating section
20 . . . Microcomputer
CB . . . Parallel cable

What is claimed is:

1. An imaging apparatus comprising:
an imaging unit that includes an imaging means for acquiring an image and a fixed pattern outputting means for outputting a fixed pattern set in advance;
a control unit that receives an image acquired by the imaging means and a fixed pattern outputted by the fixed pattern outputting means; and
a path that electrically connects the control unit to the imaging unit and electrically transmits the image and the fixed pattern from the imaging unit to the control unit,
wherein the control unit includes:
   a control means for controlling, depending on the image, an application which requires the image as one of inputs to the application; and
   an anomaly determining means for comparing a specific pattern prepared in advance in accord with the fixed pattern outputted by the fixed pattern outputting means, with the fixed pattern to determine occurrence of an anomaly in the electrical connection of the path, and
the fixed pattern is a two-dimensional pattern composed of pixels, the pixels located in a line laterally extending from a left side of the two-dimensional pattern to a right side of the two-dimensional pattern changing in intensities thereof as advancing along the line.

2. The imaging apparatus according to claim 1, wherein:
the imaging unit is internally installed in a vehicle and is configured to acquire, as the image, the image that is based on incident light from within a field of view of the imaging means that is oriented to the outside of a vehicle; and
the control means controls the application which relates to control over behaviors of the vehicle.

* * * * *